United States Patent [19]

Tatsuzawa

[11] Patent Number: 5,159,693
[45] Date of Patent: Oct. 27, 1992

[54] METHOD FOR PREVENTING OVERHEATING OF A THERMAL LINE PRINT HEAD BY DETECTING A TEMPERATURE AND ADJUSTING PRINTING BLOCKS

[75] Inventor: Hajime Tatsuzawa, Tokyo, Japan
[73] Assignee: Mutoh Industries, Ltd., Tokyo, Japan
[21] Appl. No.: 446,287
[22] Filed: Dec. 5, 1989

[30] Foreign Application Priority Data

Mar. 31, 1989 [JP] Japan ............................. 1-80867

[51] Int. Cl.⁵ .................. G06F 15/46; G01D 15/10
[52] U.S. Cl. ........................... 395/800; 395/775; 346/76 PH; 364/221.9; 364/921.8; 364/DIG. 1; 364/DIG. 2
[58] Field of Search ............ 346/76 R, 76 PH; 364/519; 395/775, 800

[56] References Cited

U.S. PATENT DOCUMENTS

| | | | |
|---|---|---|---|
| 4,262,188 | 4/1981 | Beach | 219/216 |
| 4,394,664 | 7/1983 | Lapeyre | 346/76 R |
| 4,560,993 | 12/1985 | Hakokyama | 346/76 PH |
| 4,590,488 | 5/1986 | Sullivan | 346/76 PH |
| 4,639,741 | 1/1987 | Inoue | 346/76 PH |
| 4,651,164 | 3/1987 | Abe et al. | 346/76 PH |
| 4,912,485 | 3/1990 | Minowa | 346/76 PH |
| 4,933,867 | 6/1990 | Ishigaki | 364/519 |

Primary Examiner—Thomas C. Lee
Assistant Examiner—Krisna Lim
Attorney, Agent, or Firm—Wenderoth, Lind & Ponack

[57] ABSTRACT

A control method prevents overheating of a line print head, the line print head for printing 4800 print dots per print line in response to print data. The print data is initially divided into sixteen blocks of print data denoting successive segments of the print line. The sixteen blocks of print data are then grouped into two groups and two-strobe printing is effected for one line. The temperature of the print head is detected and compared with a threshold temperature. If the temperature of the line print head exceeds the threshold temperature, subsequent print lines are carried out according to a four-strobe system, that is, the sixteen blocks of print data are divided into four groups. If the temperature of the line print head continues to exceed the threshold temperature, the printing is carried out according to an eight-strobe system, and so on. As such, by reducing the number of blocks of print data simultaneously printed, the printing operation is slowed, thus reducing overheating of the line print head.

6 Claims, 4 Drawing Sheets

METHOD FOR PREVENTING OVERHEATING OF A THERMAL LINE PRINT HEAD BY DETECTING A TEMPERATURE AND ADJUSTING PRINTING BLOCKS

BACKGROUND OF THE INVENTION

This invention relates to a method of controlling a drafting head of a thermal printer.

The drafting head of a thermal printer tends to breakdown when continually used at certain high temperatures (generally, at a temperature of about 70° C). Accordingly, heretofore, a temperature sensor is thermally coupled to the drafting head, and when the drafting head temperature becomes too high, the printing operation is suspended or interrupted.

One situation which causes the drafting head temperature to become too high is the case where the print data denotes almost total printing on a print medium. In the case of such print data, when the printing operation is suspended, the drafting head temperature drops and the continuation of the printing operation becomes possible. However, when the printing operation is thus continued, the drafting head temperature will again become too high, resulting in the application of stress on the drafting head, whereby the service life of the drafting head is shorted.

SUMMARY OF THE INVENTION

It is a purpose of the invention to provide a method for controlling a drafting head, or thermal line head, in which overheating of the head is prevented.

The thermal line head is segmented, for example, into 16 blocks. For example, data denoting 320 dots of a print line is transferred to each block. When the temperature of the thermal line head is lower than a predetermined temperature, a high speed drafting is carried out in which drafting the thermal line head is divided, for instance, into two groups of 8 blocks each, and the two groups of the head are alternately driven to print one line. This is called a two-strobe system.

When the thermal line is overheated, a controller temporarily stops the printing operation of the thermal line head. The printing operation for one line is then divided into four groups of four blocks each. This is called a four-strobe system. According to the four-strobe system, because the printing of one line is carried out in four print operations, the print time of each line increases a little, thus reducing the temperature rise rate of the thermal line head compared to that of the two-strobe system.

If the thermal line head again is overheated while printing is carried out according to the four-strobe system, the thermal line head is suspended again for a predetermined length of time, and the control is transferred to an eight-strobe system. Should the thermal line head continue to overheat, the number of the strobe system is again increased, for example, to a 16 (sixteen)-strobe system. Then, if the head is further overheated, the power source turns OFF.

DESCRIPTION OF THE PREFERRED EMBODIMENT

The preferred embodiment of the present invention will no be described in detail with reference to the attached drawings.

The transfer of data corresponding to one line to be printed by a thermal line head, or drawing head, is carried out as described below.

Figure 3:
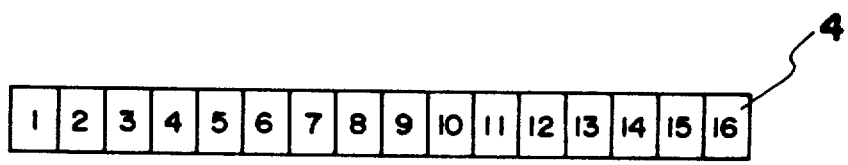
FIG. 3 is an explanatory view of printing data for one line to be transferred to the thermal head line and of the condition of the printing data divided into sixteen blocks.

In the first place, data 4 of one print line is divided into 16 blocks as shown in FIG. 3. The number assigned to each block corresponds to the data number of the drawing head 6 shown in FIG. 7, and the number of dots of the respective blocks are as shown in Table I below:

TABLE I

| DATA | 1 | 2 | 3 | 4 | 5 | 6 | 7 | 8 |
|---|---|---|---|---|---|---|---|---|
| Number of dots | 320 | 256 | 256 | 320 | 256 | 320 | 320 | 320 |
| DATA | 9 | 10 | 11 | 12 | 13 | 14 | 15 | 16 |
| Number of dots | 256 | 320 | 320 | 320 | 256 | 320 | 320 | 320 |

Incidentally, when data denoting 256 dots is transferred to the thermal line head, dummy data corresponding to 64 dots must be inserted at the foremost portion of the data.

Figure 4:
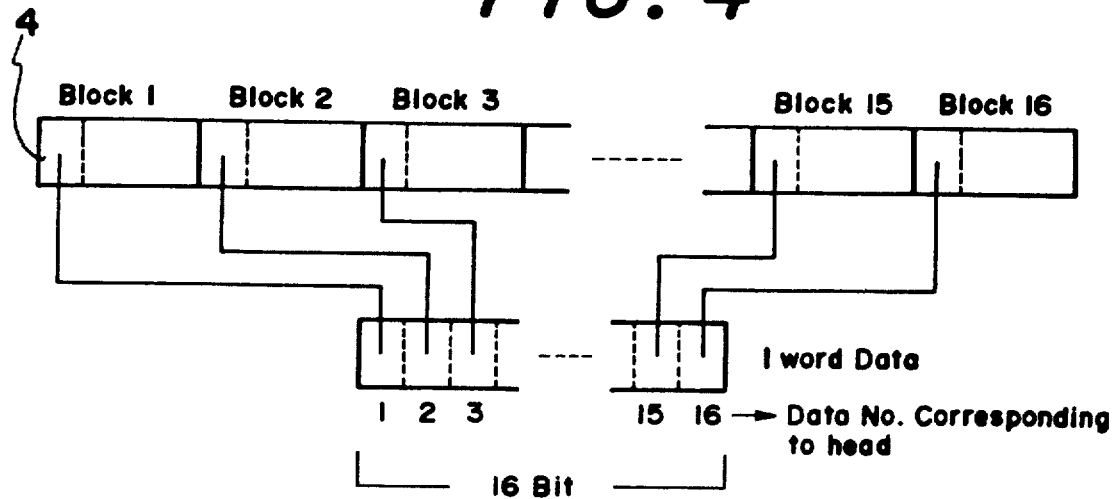
FIG. 4 is an explanatory view of a relation between each block of the printing data for one line and each block of the thermal line head.

Next, as shown in FIG. 4, the bits of dot data appearing at the leftmost portion of each block is extracted, and the 16 extracted bits are combined into a single data word. A similar operation is sequentially carried out on each next bit of dot data of each block, until 320 16-bit words are prepared.

Figure 2:
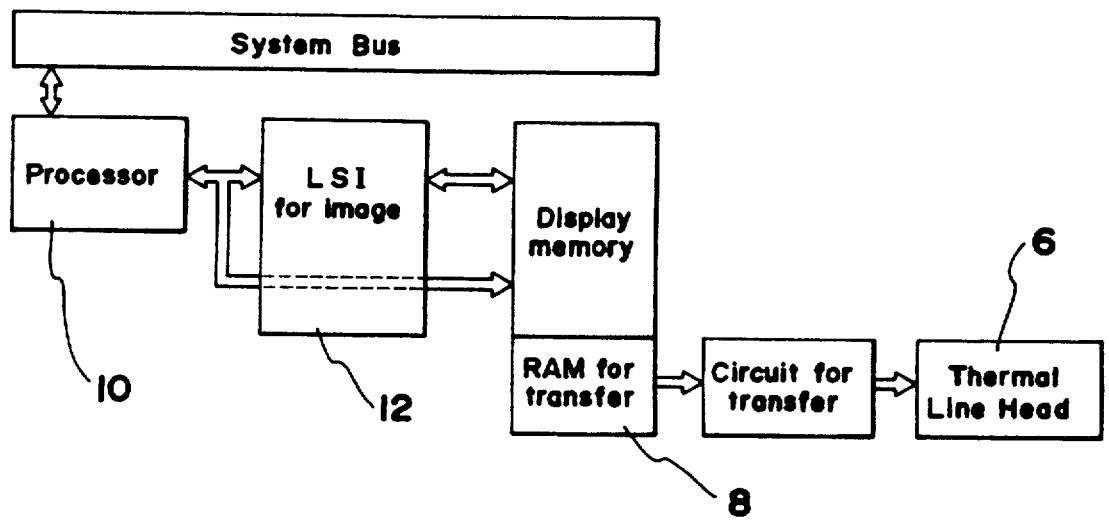
FIG. 2 is a block explanatory view depicting the principle of transforming of printing data to the drafting head or thermal line head of the thermal printer.

Referring now to FIG. 2, the 320 16-bit words are stored in a RAM 8 for transfer to the thermal line head 6. Finally, the data is transferred to the thermal line head 6 by the transfer circuit 20, whereby the printing is enabled by the latching of the data by the thermal line head 6. Incidentally, after latching of the data by the thermal line head 6, the transfer of the next data set to the drawing head 6 is enabled.

The printing procedure of one line of the thermal printer using the thermal line head can be roughly classified into the following five processes: a process 1 of forming the data for transfer to the drawing head 6 in a frame buffer by utilizing an image LSI 12; a process 2 of storing the data formed in the process 1 in a head data transfer RAM 8 by means of the image LSI 12; a process 3 of transferring the data of the RAM 8 to the thermal line head 6; a process 4 of latching the data transferred to the thermal line head 6; and a process 5 of applying pulses to the thermal line head 6.

Figure 5:
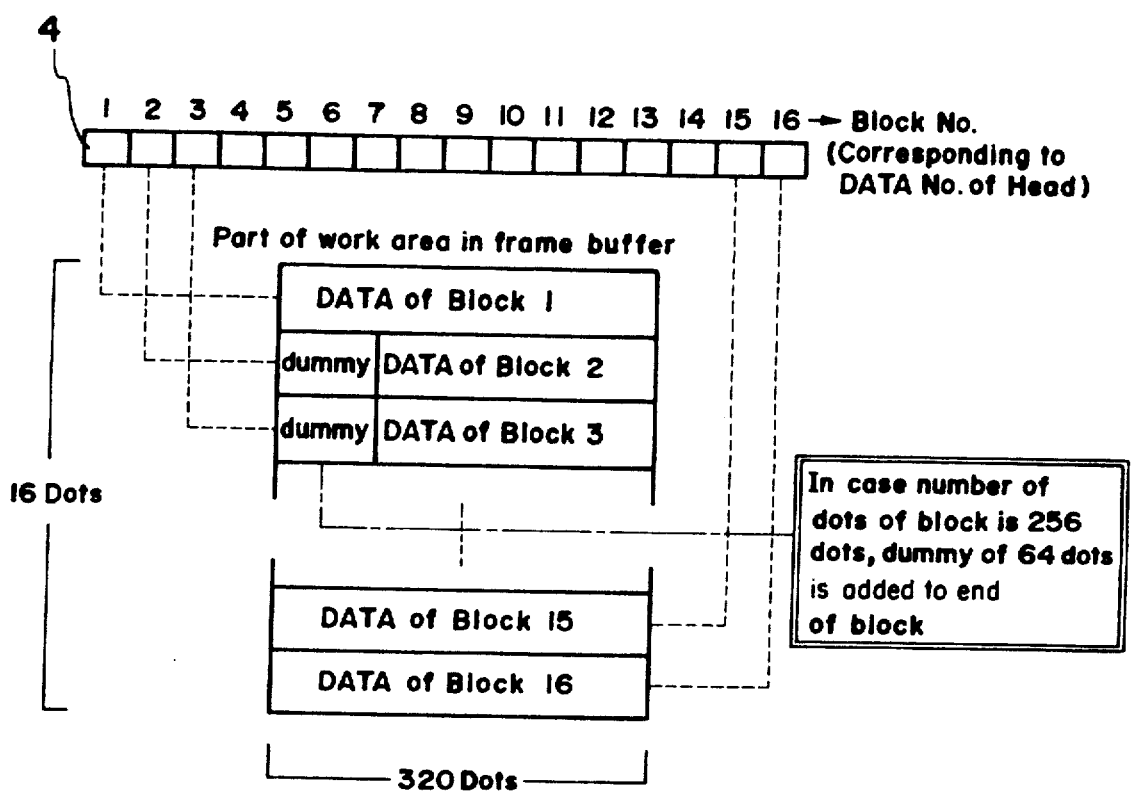
FIG. 5 is an explanatory view showing the condition in which printing data for one line are stored in a frame buffer of the controller.

The process 1 is necessary due to the special form of the data transfer to the thermal line head 6. Referring to FIG. 5, the process 1 entails dividing the data of one line into 16 blocks in the frame buffer, and changing a data configuration into a vertically stacked data block in a separate memory region. The change of the data configuration utilizes the image LSI 12.

Figure 6:
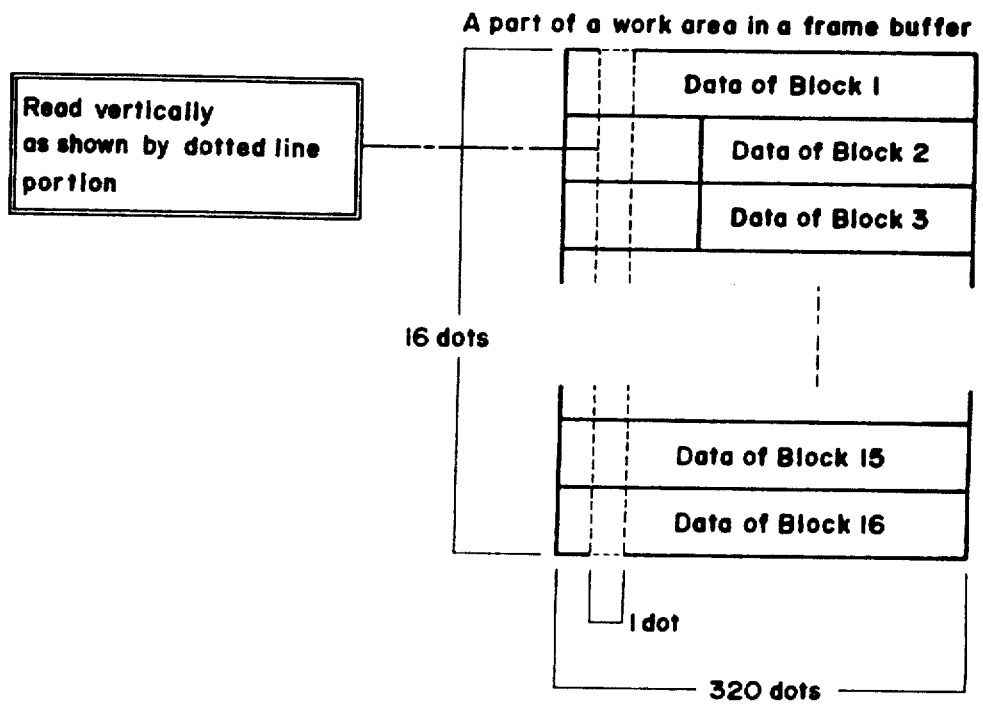
FIG. 6 is an explanatory view depicting an operation in which printing data for one line stored in the frame buffer of the controller is read.

Referring to FIG. 6, the process 2 entails reading the data of one vertical line of the configuration obtained by the process 1 and writing the thus read line into the transfer RAM 8. Reading is sequentially carried out a word at a time for each vertically extending 16-bit data word produced in the process 1 configuration starting from the leftmost side of the data configuration. The data is thus written into the RAM 8 for transfer a first-in-first-out basis.

The process 3 entails carrying out transfer of the data stored in the RAM 8 to the thermal line head 6. The actual transfer is carried out by hardware. At the time of completion of the transfer, an interruption occurs which terminates the process 3.

The process 4 entails carrying out the latching of the data transferred to the thermal line head 6. The data transferred to the thermal line head 6 is stored in a shift register in the thermal line head 6. When the data of the thermal line head 6 is latched, the data in the shift register in the thermal line head 6 is copied into a print register in the thermal line head 6. The printing operation follows the contents of this register. Accordingly, after the latching of the data, subsequent data can be transferred.

Figure 7:
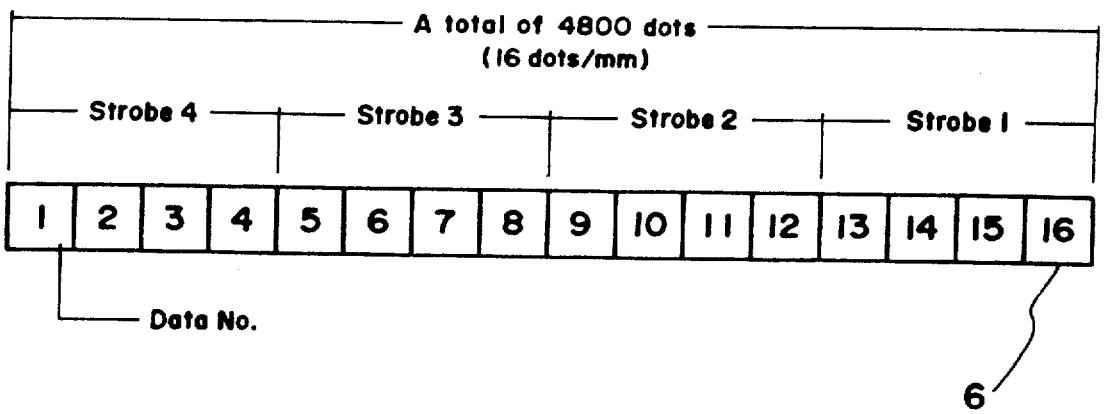
FIG. 7 is an explanatory view showing the condition of the drafting head or thermal line head divided in sixteen parts or blocks.

The process 5 entails the application of print pulses and one line feed to the thermal line head in accordance with a 2N-strobe system. The control of the application of pulses in accordance with the strobe system is necessary due to the limited capacity of the power source, and such control entails a method of sectioning the operating head 6 into 2N portions (strobing), N equals 2 as shown in FIG. 7, and outputting the pulses sequentially to the 2N respective portions.

Figure 1:
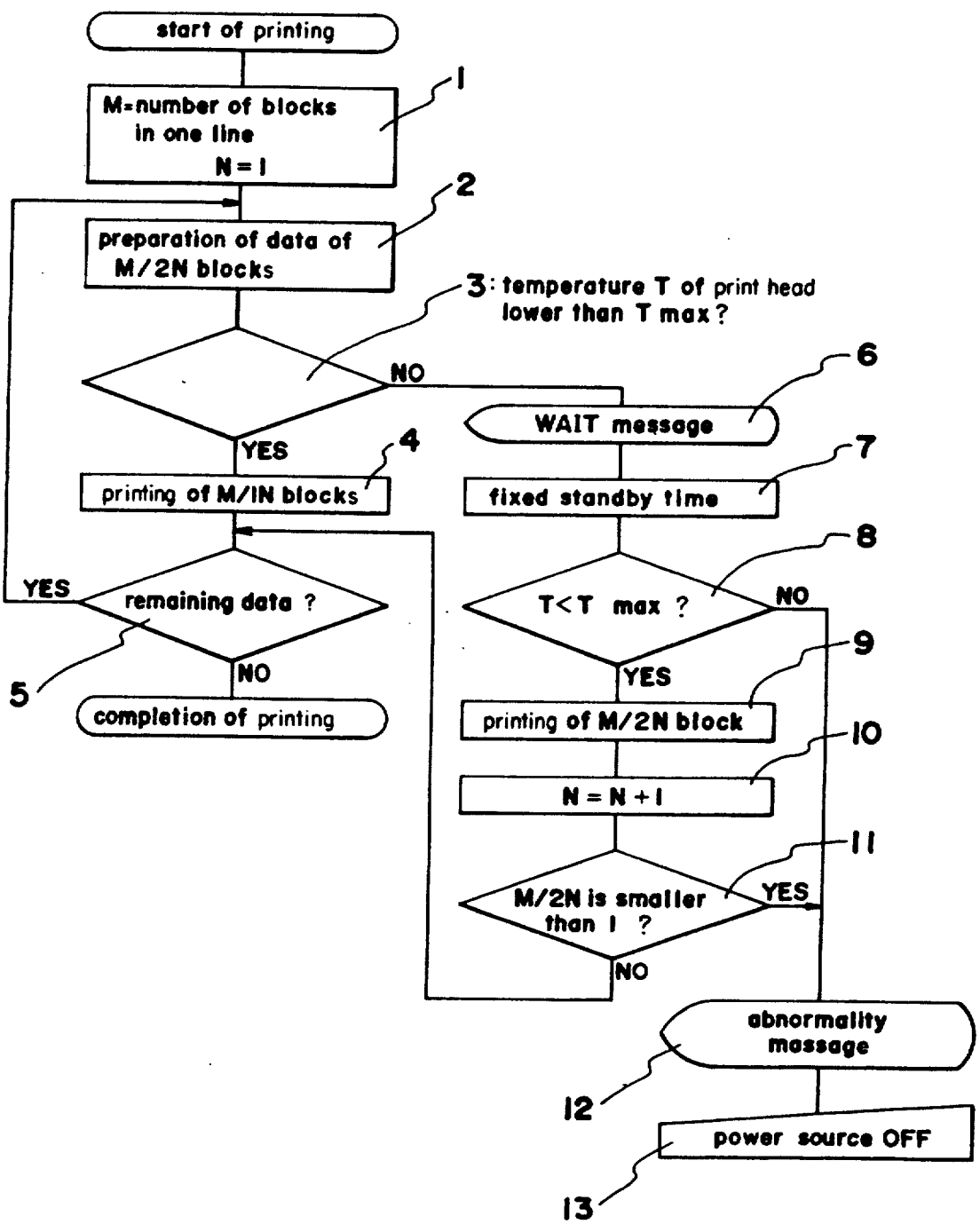
FIG. 1 is a flow chart showing a drafting head control method for a thermal printer according to the present invention.

Next, the process to counter overheating the operating head will be described by referring to the flowchart shown in FIG. 1.

In the Step 1, M denotes the number of blocks in one line, i.e. M equals 16. When the drafting operation starts, N is initially set at 1. Accordingly, $M/2^N = 16/2^1 = 8$. and the 8 blocks of data are prepared in the Step 2. Accordingly, when the drafting operation is performed in Step 4 using two 8 blocks data sets, the Data No. 1-8 shown in FIG. 7 is printed first, and the Data No. 914 16 shown in FIG. 7 is printed second. This operation corresponds to the 2 strobe general control system of the thermal line head 6. (In this case, as compared with the 4-strobe system, it is necessary to double the capacity of the power source.) The value N is initially set to effect high speed printing by establishing a relatively large number of blocks to be printed at once. In the Step 3, a discrimination is carried out as to whether or not the temperature T of the operating head 6 exceeds a rated temperature limit Tmax. When the temperature T exceeds Tmax, the display of the controller displays a WAIT message at the Step 6.

In the Step 8, a discrimination is carried out as to whether or not the temperature T exceeds Tmax after the lapse during Step 7 of a fixed standby time. If the temperature T is less than Tmax, the printing of $M/2^N$ (=8) blocks is carried out in the Step 9. Then, N is incremented by 1, $N=N+1$, in the Step 10. Thus, $N=1+1=2$, so that $M/2^N=16/2^2=4$, and the printing operation is carried out by dividing the print line into four four-blocks segments. Referring to FIG. 7, the Data No. 1-4 is first printed, and Data No. 5-8 is printed next, then the Data No. 9-12 is printed, and then the Data No. 13-16 is printed, that is, four printing operations are successively carried out. This operation corresponds to the 4-strobe system.

Similarly, if the temperature T should again exceed Tmax, N is again incremented by one whereby the printing operation is carried out according to eight two-block segments. N may be further incremented if necessary to result in sixteen one-block print segments. In the event that N becomes 5, resulting in $M/2^N=16/2^5=0.5$, in the Step 11, since $M/2^N<1$, an abnormality message is generated at the Step 12, and the power source is turned off in the Step 13.

Incidentally, at the Step 5, a discrimination is effected as to whether or not print data remains to be printed. If print data remains, the control returns to Step 2, and if no print data remains, the printing operation is complete.

As described in the foregoing, according to the present invention, when the temperature of the operating head exceeds a temperature limit, the printing operation is effected according to a smaller number of print blocks after a lapse of a standby time, whereby the printing operation is carried out efficiently without overheating of the operating head.

What is claimed is:

1. A computer implemented method of preventing overheating of a line print head, the line print head for printing a print line in response to the print data of one line, said computer implemented method comprising:

a first step of dividing the print data of one line into M blocks of print data, the M blocks of print data denoting successive segments of the print line, a second step of grouping the M blocks of print data into 2N groups, a third step of simultaneously printing the M blocks of print data for each of the 2N groups in succession, a fourth step of detecting a temperature of the line print head and comparing the thus detected temperature to a threshold temperature, and a fifth step of incrementing N by L to obtain a new value of N and returning to said second step using the new value of N to print a next print line when the temperature of the line print head exceeds the threshold temperature in said fourth step.

2. A computer implemented method as recited in claim 1, wherein the line print head is a thermal line print head for printing 4800 dots per print line, and wherein M equals 16, N initially equals 1, and L equals 1.

3. A computer implemented method of preventing overheating of the line print head, the line print head for printing a print line on a print medium in response to print data to one line, said computer implemented method comprising:

a first step of dividing the print data of one line into M blocks of print data, the M blocks of print data denoting successive segments of the print line, a second step of dividing the M blocks of print data into 2N groups, a third step of simultaneously printing the M blocks of print data for each of the 2M groups in succession, a fourth step of detecting a temperature of the line print data and comparing the thus detected temperature to a threshold temperature, a fifth step of returning to said second step to print a next print line when the temperature of the line print head is less than the threshold temperature in said fourth step, a sixth step of, when the temperature of the line print head excess the threshold temperature in said fourth step, (a) suspending the printing for a predetermined period of time, and (b) incrementing N by L to obtain a new value of N and returning to said second step using the new value of N to print a next print line.

4. A computer implemented method as recited in claim 3, wherein the line print head is a thermal line print head for printing 4800 dots per print line, and wherein M equals 16, N initially equals 1, and L equals 1.

5. A computer implemented method of preventing overheating of a line print head, the line print head for printing a print line on a print medium in response to print data of one line, said computer implemented method comprising:

a first step of dividing the print data of one line into M blocks of print data, the M blocks of print data denoting successive segments of the print line, a second step of grouping the M blocks of print data into 2N groups, a third step of simultaneously printing the M blocks of print data for each of the 2N groups in succession, a fifth step of returning to said second step to print a next print line when the temperature of the line print head is less than the threshold temperature in said fourth step, a sixth step of, when the temperature of the line print head exceeds the threshold temperature in said fourth step, (a) a suspending the printing for a predetermined period of time, (b) again detecting the temperature of the line print head and comparing the again detected temperature of the line print head to the threshold temperature, (c) stopping the printing when the again detected temperature exceeds the threshold temperature, (d) incrementing N by L to obtain a new value of N and returning to said second step using the new value of N to print a next print line when the again detected temperature of the line print head is less than the threshold temperature.

6. A computer implemented method as recited in claim 5, wherein the line print head is a thermal line print head for printing 4800 dots per print line, and wherein M equals 16, N initially equals 1, and L equals 1.

* * * * *